Jan. 4, 1938.  H. W. HOESSMAN  2,104,650
DINNER PAIL AND EGG CRATE
Filed April 15, 1937  2 Sheets-Sheet 1

Inventor
H. W. Hoessman
By L. F. Rudolph
Attorney

Jan. 4, 1938. H. W. HOESSMAN 2,104,650
DINNER PAIL AND EGG CRATE
Filed April 15, 1937 2 Sheets-Sheet 2
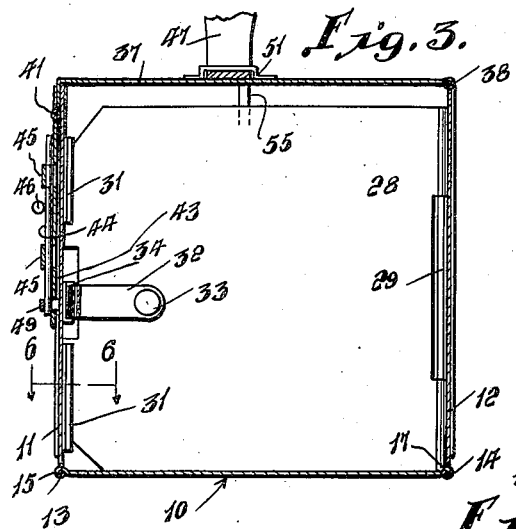
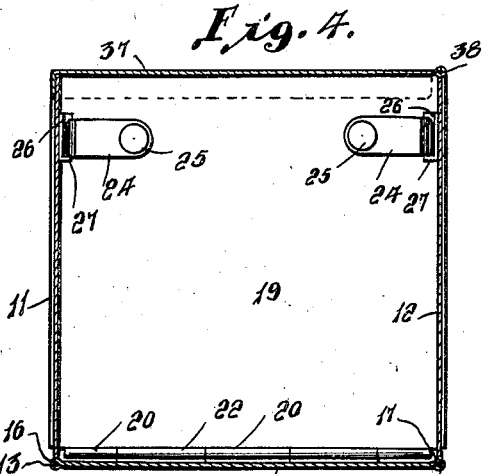
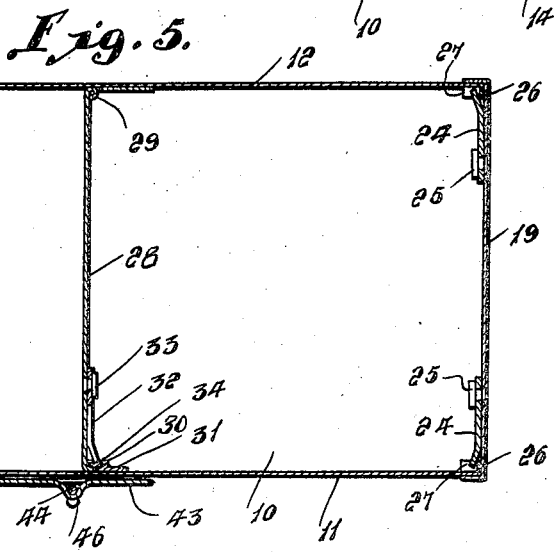
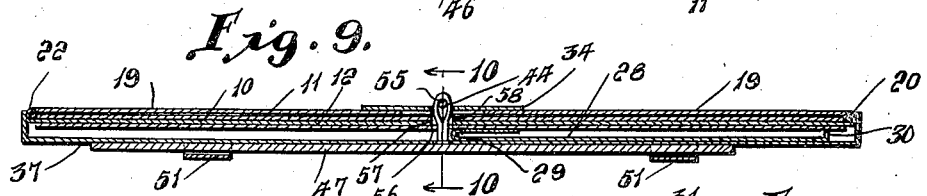
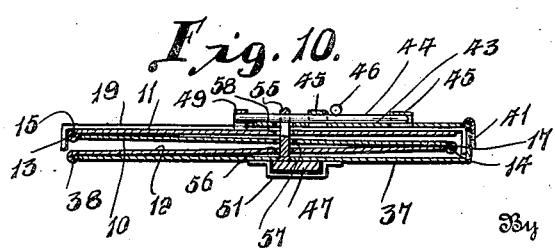
Inventor
H. W. Hoessman
By L. F. Randolph
Attorney Patented Jan. 4, 1938

2,104,650

UNITED STATES PATENT OFFICE 2,104,650

DINNER PAIL AND EGG CRATE

Henry W. Hoessman, Gibsonburg, Ohio

Application April 15, 1937, Serial No. 137,132

3 Claims. (Cl. 220—7)

This invention relates to a receptacle particularly adapted for use as a dinner pail or egg crate or the like and it aims to provide a novel construction capable of being compactly folded when not in use and of being readily assembled into receptacle form.

It is also aimed to provide an exceedingly simple construction for latching the walls together in operative form and such a construction wherein the same fastening means are used to hold the receptacle in that condition as well as to hold it in its folded or knocked-down condition.

The more specific objects and advantages will become apparent from a consideration of the description following taken in connection with accompanying drawings illustrating an operative embodiment.

In said drawings:—

Figure 3 is a cross sectional view taken on the line 3—3 of Figure 2;

Figure 4 is a cross sectional view taken on the line 4—4 of Figure 2;

Figure 5 is a horizontal sectional view taken on the line 5—5 of Figure 1;

Figure 8 is a detail section taken on the line 8—8 of Figure 7;

Figure 9 is a central vertical sectional view taken through the device in its folded condition, and Figure 10 is a detail section taken on the line 10—10 of Figure 9.

Figure 1:
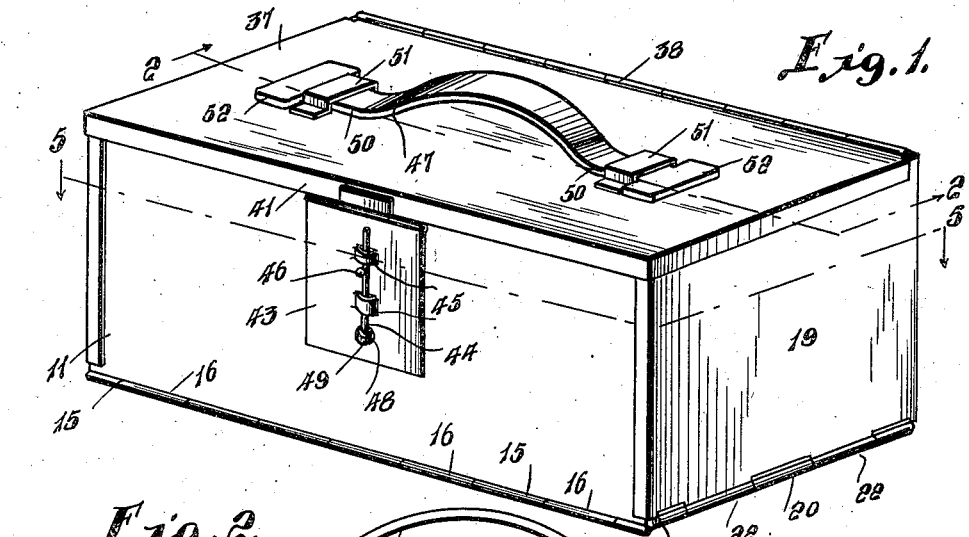
Figure 1 is a view of the device in perspective.
Figure 2:
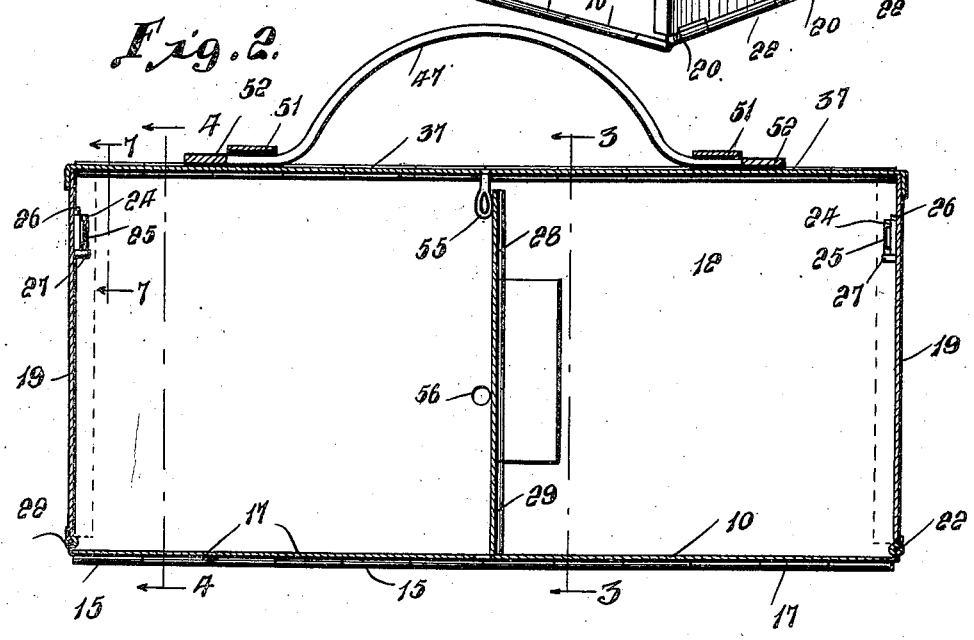
Figure 2 is a longitudinal sectional view taken on the line 2—2 of Figure 1.
Figures 6, 7:
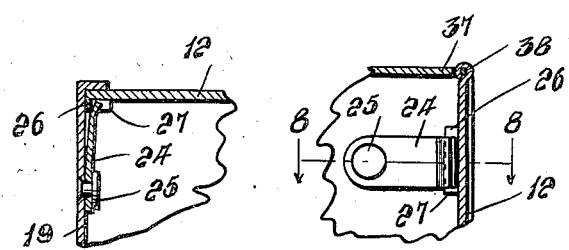
Figure 6 is a detail section taken on the line 6—6 of Figure 3.
Figure 7 is a detail section taken on the line 7—7 of Figure 2.

The receptacle constituting the invention whether built for a dinner pail, egg crate or otherwise may be made in any desired size and of any desired materials. The same has a rectangular wall at 10 which constitutes the base or bottom of the receptacle, along opposite edges of which side walls 11 and 12 are hinged by means of pintles 13 and 14, respectively, engaging interfitting barrels 15 on the walls 10 and 16 and 17, on the walls 11 and 12, respectively. In addition, end walls 19 are pivoted by means of pintles 20 to the ends of the bottom wall 10, the pintles 20 passing through barrels in the end walls 19 and barrels 22 on the ends of the bottom wall 10.

Said end walls 19 have angularly disposed flanges 23 which overlap the side walls 11 and 12 when the device is in receptacle form. These walls are secured in this relation through the medium of latches 24, pivoted at 25 to the end walls, and movable to overlapping relation with lugs 26 provided on the side walls 11 and 12, and which lugs have lateral extensions 27 at their lower end on which the latches 24 rest.

If desired, a partition 28 may be provided within the box, being pivoted at 29 to the wall 12. At the vertical edge opposite the pivot 29, hook flanges 30 are provided on the partition which are adapted to engage recesses provided by cleats 31 fastened to the wall 11. A latch 32 is also pivoted at 33 to the partition and the same is adapted to engage a lug 34 on the wall 11, similar to the lug at 26.

A top or cover wall is provided at 37, hinged to the side wall 12 by means of a pintle 38 fastened through interengaging barrels 39 and 40 on the cover 37 and wall 12, respectively. An angular flange 41 surrounds the free side and end edges of the wall 37 so as to telescope over the side wall 11 and end walls 19.

A leaf 43 is hinged to the flange 41 and it slidably mounts a bolt 44 by means of loops 45. A projection 46 is provided on the bolt to facilitate sliding thereof and it is rotated between the loops so as to prevent accidental displacement. Said leaf has an opening 48 therein through which a staple 49 on the outside of wall 11 projects, and into which the bolt 44 is adapted to be slid to secure the receptacle in operative form.

A suitable handle may be provided on the top wall 37 as at 47, being for instance of leather or other flexible material having reduced ends 50 extending through guides 51, and at the terminals of which reduced ends enlargements 52 are provided.

The device is capable of being readily folded or knocked down into the compact form shown in Figures 9 and 10 and of being secured in that form by the same bolt as is used to fasten it in assembled condition, namely 44. In folding the structure into this form of Figures 9 and 10 from flat condition, wall 11 is folded over wall 10, wall 12 is then folded beneath wall 10 and walls 12, 10, and 11 folded over wall 37 and fitting within the flange 41. Walls 19 are then folded over the wall 11, resting flat thereon since the barrels 24 are of sufficient height. The flanges along one side of each of the end walls are disposed between the longitudinal portion of the flange 14 and the adjacent walls.

A staple 55 depends from the top wall 37 and extends through openings 56, 57, and 58 in the walls 12, 10, and 11, respectively, so that in the folded condition, last mentioned staple will extend through the opening in the leaf 44 and the bolt 46 thereon slid into engagement therewith.

Various changes may be resorted to provided they fall within the spirit and scope of the invention.

I claim as my invention:—

1. A receptacle of the class described having a bottom wall, side walls hinged to the bottom wall, end walls hinged to the bottom wall, latches on certain of said walls, lugs on other of said walls engaged by the latches to hold the walls in receptacle form, end walls having angular flanges overlapping the exterior of the side walls, said latches being pivoted, and said lugs having extensions at their lower extremities on which the latches are adapted to rest, a cover pivoted to one of the side walls, bolt means carried by the cover, fastening means engageable by the bolt means to secure the cover in closed position, said cover having a depending staple on is under surface, said side walls, bottom wall and cover being foldable in superposed relation, and said side walls and bottom wall having openings therethrough through which said staple passes when the walls are folded, and said bolt means being engageable with said staple in the latter condition.

2. A receptacle of the class described having a bottom wall, side walls hinged to the bottom wall, end walls hinged to the bottom wall, latches on certain of said walls, lugs on other of said walls engaged by the latches to hold the walls in receptacle form, end walls having angular flanges overlapping the exterior of the side walls, said latches being pivoted, and said lugs having extensions at their lower extremities on which the latches are adapted to rest, a cover pivoted to one of the side walls, bolt means carried by the cover, fastening means engageable by the bolt means to secure the cover in closed position, said cover having a depending staple on its under surface, said side walls, bottom wall and cover being foldable in superposed relation, and said side walls and bottom wall having openings therethrough through which said staple passes when the walls are folded, and said bolt means being engageable with said staple in the latter condition, said cover having a depending flange to overlap a side wall and end walls, and a leaf pivoted to said flange carrying said bolt means.

3. A receptacle of the class described having a bottom wall, walls fitted to all four sides of the bottom wall, means to secure the said walls in receptacle form, two of the side walls and bottom wall having openings therethrough, a cover pivoted to one of the side walls having a staple depending from its under surface, bolt means carried by the cover, means on one of the side walls engageable by the bolt means to secure the walls in receptacle form closed, said bottom wall, cover and side walls being foldable in superposed relation with said openings in registry and said staple passing therethrough, said bolt means being engageable with the staple in the latter condition to secure the walls together in folded relation.

HENRY W. HOESSMAN.